(12) United States Patent
Soga et al.

(10) Patent No.: US 10,224,010 B2
(45) Date of Patent: Mar. 5, 2019

(54) WOODY MATERIAL FOR WIND INSTRUMENT, WIND INSTRUMENT, AND PRODUCTION METHOD OF WOODY MATERIAL FOR WIND INSTRUMENT

(71) Applicant: Yamaha Corporation, Hamamatsu-shi, Shizuoka (JP)

(72) Inventors: Kazuki Soga, Hamamatsu (JP); Kazushi Nakai, Hamamatsu (JP); Tatsuya Hiraku, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/662,979

(22) Filed: Jul. 28, 2017

(65) Prior Publication Data

US 2018/0033414 A1 Feb. 1, 2018

(30) Foreign Application Priority Data

Jul. 29, 2016 (JP) .................. 2016-150522

(51) Int. Cl.
| | | |
|---|---|---|
| *G10D 7/00* | (2006.01) | |
| *B27N 3/00* | (2006.01) | |
| *B27N 3/04* | (2006.01) | |
| *B32B 5/26* | (2006.01) | |
| *B32B 27/08* | (2006.01) | |

(Continued)

(52) U.S. Cl.
CPC ............. *G10D 7/005* (2013.01); *B27N 3/002* (2013.01); *B27N 3/04* (2013.01); *B32B 5/26* (2013.01); *B32B 21/10* (2013.01); *B32B 21/14* (2013.01); *B32B 27/08* (2013.01); *B32B 27/12* (2013.01); *B32B 27/308* (2013.01); *B32B 27/32* (2013.01);

(Continued)

(58) Field of Classification Search
CPC ....................................... G10D 7/005
See application file for complete search history.

(56) References Cited

U.S. PATENT DOCUMENTS

| | | | | |
|---|---|---|---|---|
| 2,830,004 | A | * 4/1958 | Lyons | .................. B27D 1/005 144/332 |
| 3,308,706 | A | * 3/1967 | Brilhart | ................. B29C 70/347 84/380 R |

(Continued)

FOREIGN PATENT DOCUMENTS

| | | |
|---|---|---|
| DE | 37 38 459 A1 | 5/1989 |
| JP | 54-117225 U | 2/1978 |

(Continued)

OTHER PUBLICATIONS

The Clarinet BBoard, blog Dec. 20, 2006, viewed Sep. 19, 2018 at http://test.woodwind.org/clarinet/BBoard/read.html?f=1&i=233622&t=233279.*

(Continued)

*Primary Examiner* — Robert W Horn
(74) *Attorney, Agent, or Firm* — Crowell & Moring LLP

(57) ABSTRACT

An object of the present invention is to provide a woody material for a wind instrument superior in resistance to a moisture change. The woody material for a wind instrument comprises: a plurality of veneers being laminated; and at least one buffer layer comprising a fibrous sheet constituted from a nonwoven fabric or a woven fabric, and an adhesive with which the fibrous sheet is impregnated, the buffer layer being interposed between adjacent two of the plurality of veneers.

17 Claims, 3 Drawing Sheets

(51) Int. Cl.
   B32B 27/12 (2006.01)
   B32B 21/10 (2006.01)
   B32B 21/14 (2006.01)
   B32B 27/30 (2006.01)
   B32B 27/32 (2006.01)
   B32B 27/34 (2006.01)
   B32B 27/36 (2006.01)
   B32B 27/38 (2006.01)
   B32B 27/42 (2006.01)

(52) U.S. Cl.
   CPC ............... *B32B 27/34* (2013.01); *B32B 27/36* (2013.01); *B32B 27/38* (2013.01); *B32B 27/42* (2013.01)

(56) References Cited

U.S. PATENT DOCUMENTS

| | | | | |
|---|---|---|---|---|
| 5,073,431 | A * | 12/1991 | Martinuzzo | B27D 1/00 428/102 |
| 5,496,648 | A * | 3/1996 | Held | B32B 23/04 428/511 |
| 6,180,211 | B1 * | 1/2001 | Held | B32B 27/00 428/172 |
| 6,565,959 | B1 * | 5/2003 | Tingley | B32B 3/06 428/105 |
| 7,732,057 | B2 | 6/2010 | Stokes et al. | |
| 8,217,249 | B2 * | 7/2012 | Hiraku | B27N 3/002 84/452 R |
| 9,818,380 | B2 * | 11/2017 | Luttwak | G10D 3/04 |
| 2004/0053040 | A1 * | 3/2004 | Goodson | B32B 27/12 428/326 |
| 2004/0108017 | A1 | 6/2004 | Abe et al. | |
| 2006/0272470 | A1 * | 12/2006 | Parker | B27D 1/08 84/291 |
| 2010/0005946 | A1 * | 1/2010 | Yoshino | G10D 13/028 84/411 R |
| 2010/0199831 | A1 | 8/2010 | Hiraku et al. | |
| 2015/0107434 | A1 * | 4/2015 | Soga | G10D 1/02 84/291 |
| 2016/0368276 | A1 * | 12/2016 | Potter | E04F 15/107 |
| 2018/0033414 | A1 * | 2/2018 | Soga | G10D 7/005 |
| 2018/0117884 | A1 * | 5/2018 | Luttwak | G10D 3/02 |

FOREIGN PATENT DOCUMENTS

| | | |
|---|---|---|
| JP | 2004-058416 A | 2/2004 |
| JP | 2010-184420 A | 8/2010 |

OTHER PUBLICATIONS

Extended European Search Report issued in counterpart European Application No. 17183747.9 dated Dec. 8, 2017 (eight pages).

Japanese-language Office Action issued in counterpart Japanese Application No. 2016-150522 dated Dec. 18, 2018 with English translation (five (5) pages).

* cited by examiner

WOODY MATERIAL FOR WIND INSTRUMENT, WIND INSTRUMENT, AND PRODUCTION METHOD OF WOODY MATERIAL FOR WIND INSTRUMENT

BACKGROUND OF THE INVENTION

The present invention relates to a woody material for a wind instrument, a wind instrument, and a production method of a woody material for a wind instrument.

DESCRIPTION OF THE RELATED ART

Wind instruments produced by whittling wood into a tubular shape, such as an oboe and a clarinet, have been known. Materials for such wind instruments are often relatively rare and therefore expensive, and a piece-to-piece quality variation of the materials is relatively significant.

In this regard, as a woody material for a wind instrument, use of a laminated veneer lumber (LVL) obtained by laminating veneers, i.e., thin boards cut away from wood, by an adhesive has been proposed (for example, see Japanese Unexamined Patent Application, Publication No. 2010-184420). The laminated veneer lumber is relatively inexpensive, since a most part of natural wood except for portions having a knot or a crack can be used as a raw material. Another advantage of the laminated veneer lumber is a relatively stable quality due to compensation of quality variations in raw wood materials through laminating of a large number of veneers.

The aforementioned publication discloses that an epoxy resin contained in the adhesive contributes to high strength, high acoustic velocity, and low vibration damping factor (tan δ), and also to a reduction of dimensional variation inherent to wood due to absorption and desorption of moisture. It is to be noted that, in regard to vibration characteristics of the woody material for a wind instrument as an alternative to natural wood, relatively high acoustic velocity and relatively low vibration damping factor are reportedly desired in light of achieving vibration characteristics similar to those of higher class natural wood.

The woody material for a wind instrument disclosed in the aforementioned publication, in which expansion and contraction of the veneers are inhibited by the adhesive, has a disadvantage that stress may be concentrated at an interface between the veneer and the adhesive upon expansion and contraction of the veneers due to moisture absorption and drying, and consequently interlayer delamination is likely to occur, as a trade-off for a reduction in dimensional variation through a moisture change.

PRIOR ART DOCUMENTS

Patent Documents

Patent Document 1: Japanese Unexamined Patent Application, Publication No. 2010-184420

SUMMARY OF THE INVENTION

In view of the aforementioned disadvantage, an object of the present invention is to provide a woody material for a wind instrument, and a wind instrument that are superior in resistance to a moisture change, as well as a production method of a woody material for a wind instrument.

According to an aspect of the invention made to solve the aforementioned problems, a woody material for a wind instrument comprises: a plurality of veneers being laminated; and at least one buffer layer comprising a fibrous sheet constituted from a nonwoven fabric or a woven fabric, and an adhesive with which the fibrous sheet is impregnated, the buffer layer being interposed between adjacent two of the plurality of veneers.

The fibrous sheet may be a nonwoven fabric constituted from a synthetic fiber.

An average thickness of the buffer layer is preferably no less than 0.05 mm and no greater than 0.20 mm.

An average thickness of the veneer is preferably no less than 0.5 mm and no greater than 5 mm.

A principal component of the fiber of the fibrous sheet may be a polyester, a polyamide, an acrylic resin, polyethylene, or polypropylene.

A principal component of the adhesive in the buffer layer may be an epoxy resin, a phenol resin, a urethane resin, or an acrylic resin.

The principal component of the fiber of the fibrous sheet may be a polyester, and the principal component of the adhesive may be an epoxy resin.

A percentage content of the adhesive in the buffer layer is preferably no less than 40% by mass and no greater than 90% by mass.

According to another aspect of the invention made to solve the aforementioned problems, a wind instrument is formed from a woody material comprising: a plurality of veneers; and at least one buffer layer comprising a fibrous sheet constituted from a nonwoven fabric or a woven fabric, and an adhesive with which the fibrous sheet is impregnated, the buffer layer being interposed between adjacent two of the plurality of veneers.

According to still another aspect of the invention made to solve the aforementioned problems, a production method of a woody material for a wind instrument comprises: impregnating veneers with a resin composition; impregnating a fibrous sheet constituted from a nonwoven fabric or a woven fabric with an adhesive; alternately laminating each of the veneers and the fibrous sheet impregnated with the adhesive; and hardening the resin composition with which the veneers have been impregnated and the adhesive with which the fibrous sheet has been impregnated.

It is to be noted that the term "principal component" as referred to means a component of which percentage content by mass is the greatest, and preferably a component of which percentage content by mass is no less than 50% by mass.

DESCRIPTION OF THE EMBODIMENTS

Embodiments of the present invention will be described in detail hereinafter, with appropriate reference to the drawings.

Woody Material for Wind Instrument

Figure 1:
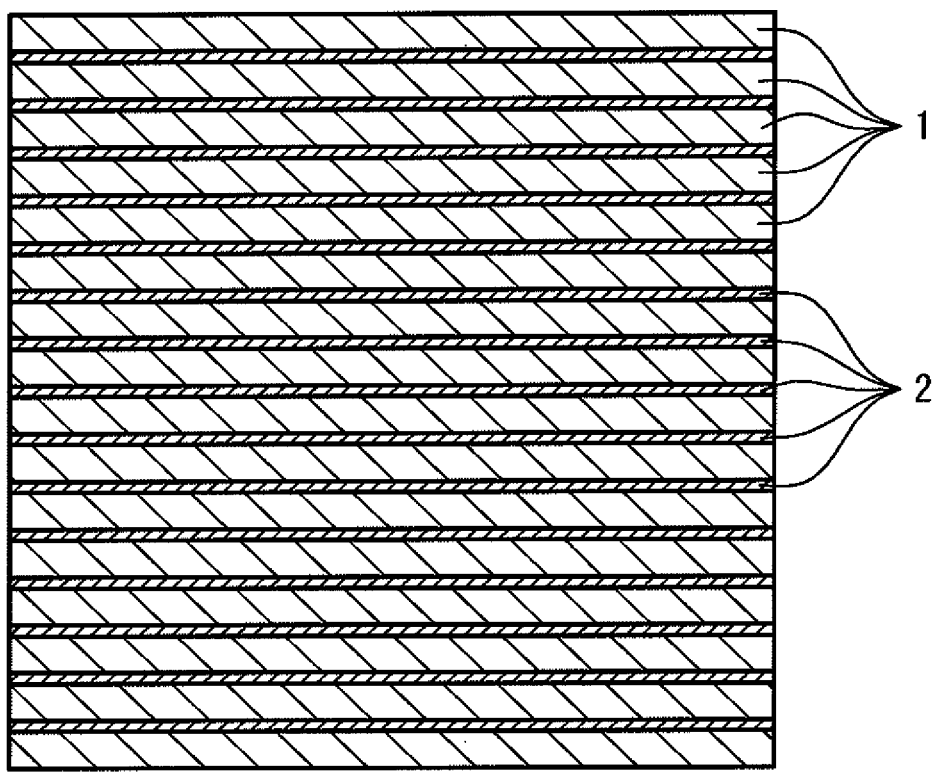
FIG. 1 is a schematic cross sectional view illustrating a layered structure of a woody material for a wind instrument according to an embodiment of the present invention.

The woody material for a wind instrument according to the embodiment of the present invention illustrated in FIG. 1 is used as a material for wind instruments such as e.g., a clarinet, an oboe, a bassoon and a recorder, that produce sound by means of a resonator formed from wood.

The woody material for a wind instrument comprises a plurality of veneers 1 being laminated and at least one buffer layer 2 being interposed between adjacent two of the plurality of veneers 1.

Veneer

The veneer 1 is a thin board cut away from natural wood. A material (type of wood) of the veneer 1 depends on a type, etc. of an instrument to be produced from the woody material for the wind instrument, but may be exemplified by grenadilla, birch, spruce, maple, oak, metanti, tamo, poplar, bubinga, mahogany, Japanese zelkova, kapur, Japanese beech and the like. Of these, birch, spruce, tamo and oak are particularly preferred. The plurality of veneers 1 may be different in material from one another.

The lower limit of an average thickness of the veneer 1 is preferably 0.5 mm and more preferably 0.7 mm. Meanwhile, the upper limit of the average thickness of the veneer 1 is preferably 5 mm and more preferably 3 mm. When the average thickness of the veneer 1 is less than the lower limit, tone of the wind instrument formed from the woody material for a wind instrument may be unnatural due to the vibration characteristics of the woody material for a wind instrument being significantly different from those of natural wood. On the other hand, when the average thickness of the veneer 1 is greater than the upper limit, quality variations of natural wood may not be sufficiently compensated.

In addition, the veneer 1 may be impregnated with a resin composition. Impregnating the veneer 1 with a resin composition enables the veneer 1 to be reinforced, and allows for using relatively inexpensive wood.

A principal component of the resin composition with which the veneer 1 is impregnated may be, for example, an epoxy resin, a phenol resin, and the like. Of these, an epoxy resin is suitably used since joining with the buffer layer 2 is relatively easy.

In the case in which the veneer 1 is impregnated with the resin composition, the lower limit of a content of the resin composition in the veneer 1 is preferably 10% by mass, and more preferably 20% by mass. Meanwhile, the upper limit of the content of the resin composition in the veneer 1 is preferably 80% by mass, and more preferably 70% by mass. When the content of the resin composition in the veneer 1 is less than the lower limit, the veneer may not be sufficiently reinforced. On the other hand, when the content of the resin composition in the veneer 1 is greater than the upper limit, the tone of the wind instrument formed from the woody material for a wind instrument may be unnatural due to an increased difference in the vibration characteristics between the woody material for a wind instrument and natural wood.

Buffer Layer

The buffer layer 2 comprises a fibrous sheet and an adhesive with which the fibrous sheet is impregnated.

Fibrous Sheet

As the fibrous sheet in the buffer layer 2, a woven fabric or a nonwoven fabric is used. Of these, a nonwoven fabric constituted from a synthetic fiber is suitably used. The fibrous sheet prevents interlayer delamination by securing a sufficient thickness of, and providing flexibility to, the buffer layer 2 to consequently enable the buffer layer 2 to expand and contract so as to follow expansion and contraction of the veneers 1.

As the nonwoven fabric serving as the fibrous sheet in the buffer layer 2, paper containing a binder for joining fibers together may also be used.

The fiber used for forming the fibrous sheet may be either a monofilament fiber or a multifilament fiber composed of a large number of monofilament fibers.

A principal component of the synthetic fiber which may be used for forming the fibrous sheet is, for example, a polyester, a polyamide, an acrylic resin, polyethylene, polypropylene and the like. Of these, a polyester is particularly preferred since selection of the adhesive is easy.

The lower limit of an average thickness of the fibrous sheet, i.e., an average thickness of the buffer layer 2 defined by the fibrous sheet, is preferably 0.05 mm and more preferably 0.07 mm. Meanwhile, the upper limit of the average thickness of the buffer layer 2 is preferably 0.02 mm and more preferably 0.16 mm. When the average thickness of the buffer layer 2 is less than the lower limit, the stress generated upon expansion and contraction of the veneers 1 may not be sufficiently relaxed. On the other hand, when the average thickness of the buffer layer 2 is greater than the upper limit, the tone of the wind instrument formed from the woody material for a wind instrument may be unnatural due to an increased difference in the vibration characteristics between the woody material for a wind instrument and natural wood.

The lower limit of a bulk density of the fibrous sheet is preferably 30 kg/m$^3$ and more preferably 50 kg/m$^3$. Meanwhile, the upper limit of the bulk density of the fibrous sheet is preferably 400 kg/m$^3$ and more preferably 300 kg/m$^3$. When the bulk density of the fibrous sheet is less than the lower limit, the thickness of the buffer layer 2 may not be maintained during production of the woody material for a wind instrument by lamination and pressure joining of the veneers 1 and the buffer layer 2. On the other hand, when the bulk density of the fibrous sheet is greater than the upper limit: impregnation with the adhesive may be insufficient and consequently mechanical strength of the woody material for a wind instrument may be insufficient; and the tone of the wind instrument formed from the woody material for a wind instrument may be unnatural due to an increased difference in the vibration characteristics between the woody material for a wind instrument and natural wood.

The lower limit of an average diameter of the fiber used for forming the fibrous sheet is preferably 1 μm and more preferably 5 μm. Meanwhile, the upper limit of the average diameter of the fiber used for forming the fibrous sheet is preferably 100 μm and more preferably 50 μm. When the average diameter of the fiber used for forming the fibrous sheet is less than the lower limit, the fibrous sheet may become unduly expensive in order to attain other properties such as the average thickness, the bulk density, and the like. On the other hand, when the average diameter of the fiber used for forming the fibrous sheet is greater than the upper limit, flexibility of the fibrous sheet, in turn of the buffer layer 2, may be insufficient and consequently the stress acting on the buffer layer 2 upon expansion and contraction of the veneers 1 may not be sufficiently relaxed. It is to be noted that the term "average diameter" as referred to means an equivalent circle diameter of a cross sectional area.

Adhesive

In the buffer layer 2, the fibrous sheet is impregnated with the adhesive such that voids in the fibrous sheet are filled with the adhesive, and simultaneously that the adhesive enables joining to the veneers 1.

The adhesive is preferably a curable adhesive containing no solvent, and being accompanied by a small volume change during a production process of the woody material for a wind instrument.

A principal component of the adhesive may be exemplified by an epoxy resin, a phenol resin, a urethane resin, an acrylic resin, and the like. Of these, an epoxy resin is suitably used which is likely to provide adhesiveness to the fibrous sheet. In the case of impregnating the veneer 1 with the resin composition, it is preferred that the principal component of the adhesive in the buffer layer 2 is a resin of the same type as the principal component of the resin composition with which the veneer 1 is impregnated.

The epoxy resin which may serve as the principal component of the adhesive in the buffer layer 2 is exemplified by a bisphenol A-type epoxy resin, a bisphenol F-type epoxy resin, a bisphenol AD-type epoxy resin, a novolac-type epoxy resin, a biphenyl-type epoxy resin, and the like.

The lower limit of a content of the adhesive in the buffer layer 2 is preferably 40% by mass, and more preferably 50% by mass. Meanwhile, the upper limit of the content of the adhesive in the buffer layer 2 is preferably 90% by mass, and more preferably 80% by mass. When the content of the adhesive in the buffer layer 2 is less than the lower limit, an adhesion strength may be insufficient. On the other hand, when the content of the adhesive in the buffer layer 2 is greater than the upper limit, quality of the woody material for a wind instrument may vary due to a failure to apply sufficient pressure during production.

Production Method

The woody material for a wind instrument is enabled to be produced by a method comprising: impregnating the veneers 1 with the resin composition (veneer impregnating step); impregnating the fibrous sheet with the adhesive (fibrous sheet impregnating step); alternately laminating each of the veneers 1 and the fibrous sheet impregnated with the adhesive (laminating step); and hardening the resin composition with which the veneers have been impregnated and the adhesive with which the fibrous sheet has been impregnated (hardening step).

Veneer Impregnating Step

In the veneer impregnating step, the veneers 1 are immersed in the resin composition with which the veneers 1 are to be impregnated, to thereby impregnate the veneers 1 with the resin composition. The resin composition with which the veneers 1 are to be impregnated may be diluted with a solvent.

Fibrous Sheet Impregnating Step

In the fibrous sheet impregnating step, the fibrous sheet is impregnated with the adhesive. It is preferred that the fibrous sheet is impregnated with an excessive amount of the adhesive in this fibrous sheet impregnating step.

Laminating Step

In the laminating step, a plurality of veneers having been impregnated with the resin composition in the veneer impregnating step are laminated, with the interposition of the fibrous sheet having been impregnated with the adhesive in the fibrous sheet impregnating step.

Hardening Step

In the hardening step, the adhesive is hardened in a state in which a laminate of the veneers 1 and at least one fibrous sheet is pressurized.

A pressure to be applied to the laminate of the veneers 1 and the fibrous sheet is selected depending on, for example, viscosity of the adhesive, a modulus of elasticity of the fibrous sheet, and the like. Typically, the lower limit of the pressure to be applied to the laminate of the veneers 1 and the fibrous sheet is preferably 0.1 MPa, and more preferably 0.2 MPa. Meanwhile, the upper limit of the pressure to be applied to the laminate of the veneers 1 and the fibrous sheet is preferably 2 MPa, and more preferably 1 MPa. When the pressure to be applied to the laminate of the veneers 1 and the fibrous sheet is less than the lower limit, a surplus of the adhesive may not be squeezed out and may form, between the fibrous sheet and the veneer 1, a layer constituted only from the adhesive. On the other hand, when the pressure to be applied to the laminate of the veneers 1 and the fibrous sheet is greater than the upper limit, the fibrous sheet may be squashed, resulting in insufficient thickness of the buffer layer 2.

The lower limit of a heating temperature in the hardening step depends on a type of the adhesive, but is preferably 60° C. and more preferably 80° C. Meanwhile, the upper limit of the heating temperature in the hardening step is preferably 180° C. and more preferably 150° C. When the heating temperature in the hardening step is less than the lower limit, an effect of the adhesive may not be enhanced. On the other hand, when the heating temperature in the hardening step is greater than the upper limit, the veneers 1 may be damaged.

The lower limit of a time period of pressurizing and heating in the hardening step depends on a type of the adhesive, but is preferably 15 min and more preferably 40 min. Meanwhile, the upper limit of the time period of pressurizing and heating in the hardening step is preferably 360 min and more preferably 300 min. When the time period of pressurizing and heating in the hardening step is less than the lower limit, the adhesive may not be sufficiently hardened. On the other hand, when the time period of pressurizing and heating in the hardening step is greater than the upper limit, the production cost may be unduly increased.

Advantages

In the woody material for a wind instrument, the plurality of veneers 1 are laminated with the interposition of the buffer layer 2 of a certain thickness, which distributes the stress generated upon expansion and contraction of the veneers 1 due to a moisture change, thereby enabling the interlayer delamination to be prevented. Consequently, the woody material for a wind instrument is superior in the resistance to a moisture change.

Wind Instrument

Figure 2:
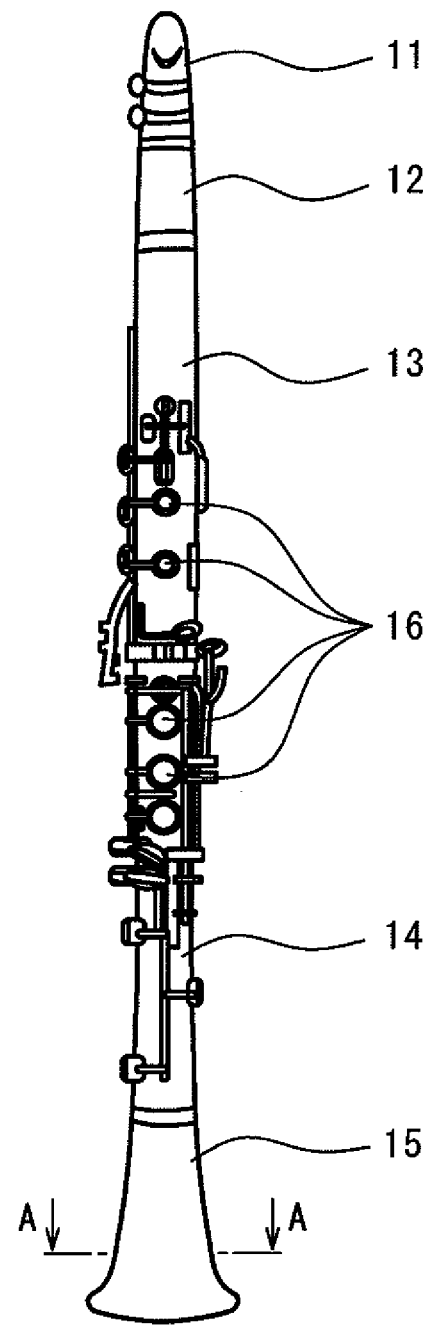
FIG. 2 is a front view of a clarinet according to another embodiment of the present invention.

FIG. 2 illustrates a clarinet as an embodiment of the wind instrument according to the present invention. The clarinet comprises: a mouth piece 11; a barrel joint 12; an upper joint 13; a lower joint 14; a bell 15; a plurality of tone holes provided on the upper joint 13 and the lower joint 14; and a plurality of keys 16 for covering the tone holes.

The mouth piece 11, the barrel joint 12, the upper joint 13, the lower joint 14, and the bell 15 of the clarinet are formed from a woody material. The woody material for a wind instrument illustrated in FIG. 1 is used as the woody material for forming the clarinet.

Figure 3:
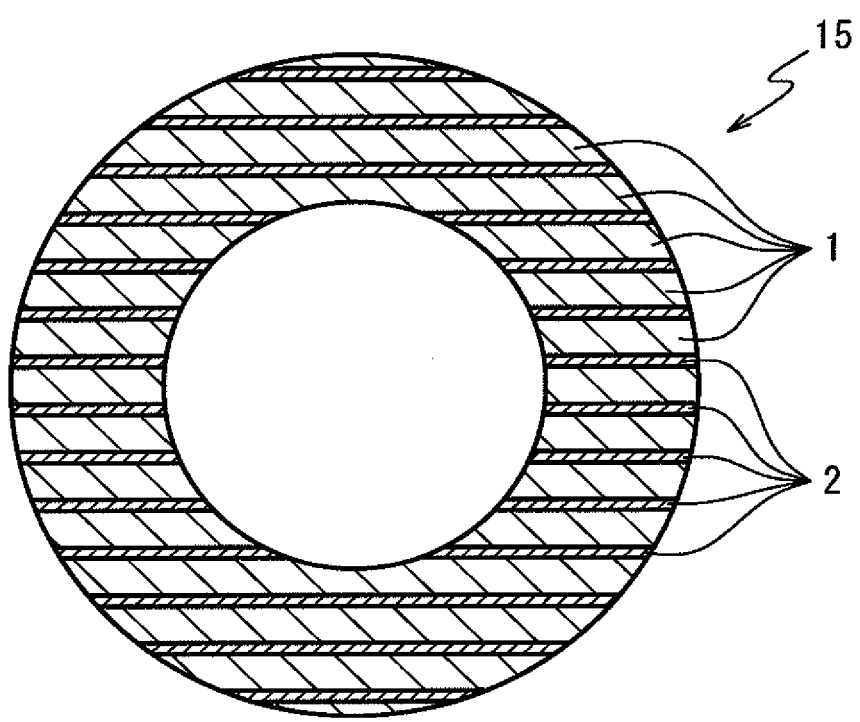
FIG. 3 is an end view taken along a line A-A of the clarinet illustrated in FIG. 2.

As representatively shown by the bell 15 illustrated in FIG. 3, in the clarinet, the woody material comprises the plurality of veneers 1 and the buffer layers 2 being interposed between adjacent two of the plurality of veneers 1. As described above, the buffer layer 2 comprises the fibrous sheet constituted from a nonwoven fabric or a woven fabric, and the adhesive with which the fibrous sheet is impregnated.

Advantages

The clarinet formed from the woody material obtained by laminating the veneers 1 and the buffer layers 2: is relatively inexpensive but capable of producing sound similar to that of a clarinet formed from a relatively expensive natural wood; exhibits little product-to-product quality variation; and is superior in resistance to a moisture change.

Other Embodiments

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

In the woody material for a wind instrument, a single buffer layer may comprise a plurality of fibrous sheets.

A Veneer not having been impregnated with the resin composition may also be used in the woody material for a wind instrument. Therefore, the veneer impregnating step may be omitted in the production method of the woody material for a wind instrument.

The wind instrument according to the embodiment of the present invention may be, in addition to the clarinet, any wind instrument that produces sound by means of a resonator formed from wood, such as an oboe, a bassoon and a recorder.

EXAMPLES

Hereinafter, the present invention is described in detail by way of Examples, but the present invention should not be restrictively construed as being limited on the basis of the description of the Examples.

Production Example 1

As production example 1, a woody material for a wind instrument was produced by laminating a plurality of veneers impregnated with a resin composition, with the interposition of a fibrous sheet impregnated with an adhesive, and pressurizing and heating a laminate thus obtained.

Veneers

As the veneers, rotary birch veneers in a rectangular board shape of 330 mm in width, 500 mm in length, and 1 mm in thickness were used.

Resin Composition

As the resin composition with which the veneers are impregnated, an epoxy resin "JER828" available from Mitsubishi Chemical Corporation was used. The veneers were impregnated with a mixture of the epoxy resin and a hardening agent.

Fibrous Sheet and Adhesive

As a fibrous sheet having been impregnated with an adhesive beforehand, a resin-impregnated sheet of 0.1 mm in thickness and 120 g/m$^2$ in weight was used.

Production example 1 was obtained by: laminating ten veneers having been impregnated with the resin composition, with the interposition of the fibrous sheet having been impregnated with the adhesive; heating a laminate thus obtained to 150° C. while pressurizing under a pressure of 0.5 MPa by using a press machine; and maintaining for 3 hrs to harden the adhesive.

Production Example 2

As production example 2, a woody material for a wind instrument was produced by laminating a plurality of veneers impregnated with a resin composition, and pressurizing and heating a laminate thus obtained.

The veneers and the resin composition used were the same as those used for production example 1.

Production example 2 was obtained by: laminating ten veneers having been impregnated with the resin composition with no sheet being interposed; heating a laminate thus obtained to 150° C. while pressurizing under a pressure of 0.5 MPa by using a press machine; and maintaining for 3 hrs to harden the adhesive.

Five test pieces were cut out from each of production example 1 and production example 2, and compression shear strength after shaping was measured for each test piece. For each of production example 1 and production example 2, an average value, a maximum value, and a minimum value of the compression shear strength thus measured are shown in Table 1 below. It is to be noted that the compression shear strength was measured in accordance with JIS-K6852 (1994).

TABLE 1

| Compression shear strength (MPa) | Average value | Maximum value | Minimum value |
| --- | --- | --- | --- |
| Production example 1 | 16.5 | 18.8 | 14.2 |
| Production example 2 | 6.7 | 8.6 | 3.5 |

In addition, the test pieces were maintained for 72 hrs in a thermoregulated bath at a temperature of 50° C. and a relative humidity of 95%; and then maintained for 96 hrs in a thermoregulated bath at a temperature of 50° C. and a relative humidity of 35%. Microscopic observation of cross sections of the test pieces revealed that only production example 2 exhibited interlayer delamination.

Accordingly, it was verified that by laminating the plurality of veneers with the interposition of the fibrous sheet impregnated with the adhesive, more effective prevention of interlayer delamination upon moisture absorption was enabled, as compared to the case of laminating the veneers only by the adhesive.

INDUSTRIAL APPLICABILITY

The woody material for a wind instrument and the wind instrument according to embodiments of the present invention are applicable for providing a high-quality and inexpensive wind instrument having a resonator made of wood.

EXPLANATION OF THE REFERENCE SYMBOLS

1 Veneer
2 Buffer layer
11 Mouth piece
12 Barrel joint
13 Upper joint
14 Lower joint
15 Bell
16 Key

The invention claimed is:
1. A woody material wind instrument tube, comprising:
a plurality of laminated veneers oriented in plural parallel planes;
a plurality of buffer layers made of fibrous sheets constituted from a nonwoven fabric or a woven fabric, and an adhesive with which the fibrous sheets are impregnated interposing between each adjacent two laminated veneers; and
a circular bore and a circular exterior circumference tube made of the alternating laminated veneers and fibrous sheets layers laminated together.

2. The woody material wind instrument tube according to claim 1, wherein each fibrous sheet is a nonwoven fabric constituted from a synthetic fiber.

3. The woody material wind instrument tube according to claim 1, wherein an average thickness of the plurality of buffer layers is no less than 0.05 mm and no greater than 0.20 mm.

4. The woody material wind instrument tube according to claim 1, wherein an average thickness of the laminated veneers is no less than 0.5 mm and no greater than 5 mm.

5. The woody material wind instrument tube according to claim 1, wherein a principal component of the fiber of the fibrous sheets is a polyester, a polyamide, an acrylic resin, polyethylene, or polypropylene.

6. The woody material wind instrument tube according to claim 1, wherein a principal component of the adhesive in the buffer layers is an epoxy resin, a phenol resin, a urethane resin, or an acrylic resin.

7. The woody material wind instrument tube according to claim 1, wherein:
the principal component of the fiber of the fibrous sheets is a polyester; and
the principal component of the adhesive is an epoxy resin.

8. The woody material wind instrument tube according to claim 1, wherein a percentage content of the adhesive in the buffer layers is no less than 40% by mass and no greater than 90% by mass.

9. A woody material wind instrument tube comprising:
a plurality of laminated veneers; and
at least one buffer layer comprising a fibrous sheet constituted from nonwoven randomly laid fabric, and an adhesive with which the fibrous sheet is impregnated, the buffer layer being interposed between adjacent two of the plurality of laminated veneers.

10. The woody material wind instrument tube according to claim 9, wherein the fibrous sheet is a nonwoven fabric constituted from a synthetic fiber.

11. The woody material wind instrument tube according to claim 9, wherein an average thickness of the of buffer layer is no less than 0.05 mm and no greater than 0.20 mm.

12. The woody material wind instrument tube according to claim 9, wherein an average thickness of the laminated veneers is no less than 0.5 mm and no greater than 5 mm.

13. The woody material wind instrument tube according to claim 9, wherein a principal component of the fiber of the fibrous sheet is a polyester, a polyamide, an acrylic resin, polyethylene, or polypropylene.

14. The woody material wind instrument tube according to claim 9, wherein a principal component of the adhesive in the buffer layer is an epoxy resin, a phenol resin, a urethane resin, or an acrylic resin.

15. The woody material wind instrument tube according to claim 9, wherein:
the principal component of the fiber of the fibrous sheet is a polyester; and
the principal component of the adhesive is an epoxy resin.

16. The woody material wind instrument tube according to claim 9, wherein a percentage content of the adhesive in the buffer layer is no less than 40% by mass and no greater than 90% by mass.

17. A method for making a woody material of a wind instrument, comprising:
arranging a plurality of laminated veneers in plural parallel planes;
forming a plurality of buffer layers made of fibrous sheets using a nonwoven fabric or a woven fabric;
impregnating the fibrous sheets with an adhesive, interposing between each adjacent two laminated veneers; and
forming a circular bore and a circular exterior circumference tube made using the alternating laminated veneers and fibrous sheet layers laminated together.

\* \* \* \* \*